Patented June 10, 1947

2,421,842

UNITED STATES PATENT OFFICE 2,421,842

PROCESS OF PRODUCING TALL OIL DRYING OILS

Frederick Charles Martin, Guttenberg, N. J.

No Drawing. Application December 1, 1944,
Serial No. 566,259

23 Claims. (Cl. 260—97.5)

My present invention relates to processes of treating tall oil, and more particularly to processes of preparing drying oils from tall oil.

It is an object of my present invention to produce from tall oil, which is a by-product of sulphate pulp or kraft paper manufacture, valuable products which can be used for many purposes.

It is another object of my present invention to produce from tall oil drying oils of excellent quality which will blend and be compatible with natural drying oils such as linseed, oiticica and similar oils.

It is a further object of my present invention to produce from tall oil a drying oil which might be well combined with dehydrated castor oil and will well blend with the same.

Still another object of my present invention consists in producing a drying oil which can be used for coating purposes and when applied forms a hard, tough and extremely water and alkali resistant film.

Still a further object of my present invention consists in producing a drying oil which is particularly adapted for manufacture of core oils, eliminating by its use the necessity for addition of rosins in the production of such oils.

Finally, it is also an object of my present invention to produce drying oils which, alone or in combination with other oils, will be well adapted for the manufacture of varnishes and speed up their production and produce more varnishes per kettle hour compared with that of varnishes containing only natural drying oils as linseed or similar oils.

As mentioned above, tall oil is a by-product of sulphate pulp or kraft paper manufacture and is composed preponderantly of fatty acids, resin acids, unsaponifiable matter and coloring impurities.

Various treatments, e. g. dehydration, refining and polymerisation of the raw tall oil result in various finished oils, all of which dry more or less rapidly with or without the addition of dryers. It has been noted, however, that films, e. g. coatings obtained from such oils do not retain their original hardness which they have immediately after drying, but show a decided tendency toward getting soft in the case of dried films and toward becoming brittle after a certain time in the case of baked films.

I have found that excellent drying oils can be obtained if the raw tall oil is treated in such a manner that the double bonds in the oil are shifted from isolated to conjugated position. Furthermore, I have found that the isomerisation of double bonds in tall oil results in production of fast drying oils containing conjugated systems of double bonds; such drying oils may be produced from raw or cleaned distilled tall oil in which isolated double bond constituents predominate.

With above objects and considerations in view, my present invention mainly consists in subjecting tall oil to esterification in the presence of at least one siliceous catalyst so as to produce a drying oil. I have found that most siliceous substances, particularly siliceous compounds, are well adapted for the purposes of my present invention; however, particularly good results were obtained by use of fuller's earth, floridin, bentonite, diatomaceous earth, celite, kieselguhr, silica gel, silicic acid, and pumice.

I have also found that activated compounds of pure silica are often not as efficient as the silicates of other metals; thus, for instance, floridin and bentonite are better catalysts and have a better catalytic action for the purposes of the present invention than for instance silica gel and silicic acid.

My process is preferably carried out by esterifying tall oil with at least one polyhydric alcohol in the presence of an alkaline catalyst and a siliceous catalyst of the above described type; as mentioned above this siliceous catalyst is adapted to increase the amount of conjugated constituents.

Various polyhydric alcohols may be used for the purposes of the present invention. However, I have found that glycerol, ethylene glycol, mannitol, sorbitol and pentaerythritol worked particularly well as esterification agents.

Similarly, various alakaline catalysts may be used; however, also in this case certain substances, namely zinc oxides, hydrated zinc and calcium naphthenate proved particularly adapted for the purposes of the present invention.

I have furthermore found that it is of importance to carry out the esterification step mentioned above in a strictly inert atmosphere so as to prevent any tendency to oxidative side reactions. Such an inert atmosphere can be produced by filling the reaction chamber with an inert gas as nitrogen or carbon dioxide to the complete exclusion of oxygen or by the use of vacuum. In this way, decomposition and undesired polymerisation reactions are held to a minimum.

In accordance with a preferred embodiment of my present invention, the new drying oils are produced by heating the tall oil mixed with a polyhydric alcohol acting as esterifying agent in the presence of alkaline and siliceous catalysts of the above described type until the desired reaction takes place, then cooling the thus treated oil and filtering it. Preferably, the temperature to which the reaction mixture is heated is between 180° and 350° C; I have found that below 180° C, the reaction is slow or does not occur at all and above 350° C. certain reactions set in which interfere with the formation of conjugated constituents.

I wish to mention that although the siliceous catalysts actually determine to a large extent the amount of conjugated constituents, I have found that combination of such siliceous catalysts with various alkaline catalysts is of great advantage, since the latter have a certain isomerisation effect, also increasing the amount of conjugated constituents.

My new process changes the physical composition of the original tall oil to a very large extent and greatly influences also its chemical composition. Furthermore, the treatment has a strong splitting action on the treated oil and results in chemical dehydration of the same. Thus, the final product, namely the resultant drying oil, which is a product of my process, does not resemble at all the original tall oil. I wish to note, however, that it is a particular ester resulting in an artificial drying oil formed during the process of esterification and characterized by a considerable increase in conjugated constituents.

The thus produced drying oil forms a strong coating when dried and bakes into a tough, hard, water resistant film. The finished product is, as mentioned above, compatible with linseed, liquefied oiticica, dehydrated castor and other natural drying oils. It can be used alone or together with such natural drying oils for the most different purposes, as for instance paints and varnishes, coatings for paper and cloth, printing inks, core oils, mold oils, grinding oils, and vehicle for aluminum paint.

The following examples will illustrate my process, although I do not limit myself to the conditions as disclosed in these particular examples.

Example I 300 parts tall oil, 34 parts glycerol, 1.5 parts zinc oxide and 8 parts celite are placed in a closed aluminum reaction vessel. Thereafter, carbon dioxide is introduced into this reaction vessel. Then the mixture in this vessel is slowly heated while being agitated.

This slow heating is carried out in such a manner that a temperature of 300° C. is reached in about 8 hours. During this heating, a strong reaction within the vessel is observed and from time to time distillates escape through a condenser into a separate receptacle. The mixture is periodically tested and its acid number and viscosity controlled. When the acid number is considered sufficiently low and the desired degree of viscosity is achieved, the oil is cooled to 120° C; then the thus cooled finished oil is filtered so as to remove all impurities.

The oil obtained in this way has excellent drying qualities and after addition to the usual amount of metal dryers, for instance cobalt and manganese dryers, it can be used very well for coating purposes.

Example II 300 parts of tall oil are mixed with 10 parts bentonite, 33 parts mannitol and one part of calcium naphthenate and treated in an inert atmosphere in exactly the same way as described in Example I.

Also the oil obtained by this treatment shows a substantial increase in conjugated constituents and greatly improved drying qualities.

Example III 300 parts of tall oil together with 12 parts of floridin are placed in a reaction vessel; then, carbon dioxide is introduced and the mixture heated under agitation. This heating is continued until a temperature of 300° is obtained. This temperature is maintained for about half an hour and thereafter the mixture cooled to about 120° C. Then, to the thus treated mixture about 30 parts of pentaerythritol—which is a tetrahydric primary alcohol—and one part calcium naphthenate are added; thereafter, the temperature of the mixture is raised to 320° C. Of course, during this heating, the mixture is agitated and an inert atmosphere maintained in the reaction vessel. After this treatment, the mixture is cooled and filtered in order to clarify the oil. The resultant drying oil has a low acid number and substantially increased viscosity.

With cobalt and manganese dryers added, the oil obtained by above process produces a very strong, hard and tough film. Thus, for instance, a certain amount of the obtained oil was reduced to 60% solids and mixed with 4% of cobalt and manganese and thereafter the thus obtained mixture was baked for about one hour at 295°; this treatment resulted in a tough flexible film. Of course, it is also possible to omit the heating and to dry the oil with the added cobalt and manganese exposed to air of usual temperature; in this case, it takes about 22 to 24 hours until a film is obtained.

Example IV 300 parts of tall oil are mixed with 90 parts of pumice, 42 parts of ethylene glycol and 3 parts of zinc oxide. This mixture is heated in an inert atmosphere for about four hours until a temperature of 295° C. is obtained; this temperature is maintained for one hour and thereafter the mixture is cooled and further treated as described in the above examples.

Example V 275 parts of tall oil and 25 parts of Perilla oil and 12 parts of floridin are mixed and heated in an inert atmosphere until a temperature of about 280° C. is obtained; this temperature is maintained for one hour and thereafter the mixture is cooled to 140° C. as rapidly as possible.

To the thus treated mixture about 27 parts of pentaerythritol and about .5 part of calcium naphthenate are added; thereafter, the thus obtained mixture is heated under agitation in a partial vacuum of about 18" to about 160° C. and this temperature is maintained for about one hour; then, the temperature is slowly raised further to about 300° C. during which time a vacuum of about 27" is maintained; the thus heated mixture is held at this temperature until the desired low acid number and the required viscosity are attained. The mixture is then cooled and finally filtered.

The oil obtained by this process possesses marked drying qualities and can be used with great advantages for many paint and varnish compositions.

It will be understood that each of the elements described above, or two or more together, may also find a useful application in other types of processes of producing drying oils differing from the types described above.

While I have described the invention as embodied in processes of producing drying oils from tall oil, I do not intend to be limited to the details shown, since various modifications may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. In the process of treating tall oil, the step of esterifying said oil with at least one polyhydric alcohol in the presence of at least one siliceous catalyst.

2. In the process of treating tall oil, the step of esterifying said oil with at least one polyhydric alcohol in the presence of at least one alkaline catalyst and at least one siliceous catalyst.

3. Method of producing a drying oil from tall oil comprising esterifying said oil with at least one polyhydric alcohol in an inert atmosphere in the presence of at least one alkaline catalyst and at least one siliceous catalyst.

4. Method of producing a drying oil from tall oil comprising the step of heating a mixture of said oil, at least one polyhydric alcohol, at least one alkaline catalyst and at least one siliceous catalyst in an inert atmosphere to between 180° and 350° C.

5. Method of producing a drying oil from tall oil comprising the step of heating said oil mixed with at least one polyhydric alcohol, at least one alkaline catalyst and at least one catalytically active siliceous compound to a temperature of between 180° and 350° C.

6. Method of producing a drying oil from tall oil comprising esterifying said oil with pentaerythritol in an inert atmosphere in the presence of at least one alkaline catalyst and at least one siliceous catalyst.

7. Method of producing a drying oil from tall oil comprising esterifying said oil with pentaerythritol in the presence of at least one alkaline catalyst and at least one siliceous catalyst.

8. Method of producing a drying oil from tall oil comprising the step of heating a mixture of said oil, pentaerythritol, at least one alkaline catalyst and at least one siliceous catalyst to a temperature of between 180° and 350° C.

9. Method of producing a drying oil from tall oil comprising the step of heating a mixture of said oil, at least one polyhydric alcohol, at least one alkaline catalyst and floridin in an inert atmosphere to between 180° and 350° C.

10. In the process of treating tall oil, the step of esterifying said oil with at least one polyhydric alcohol in the presence of at least one alkaline catalyst and bentonite.

11. In the process of treating tall oil, the step of esterifying said oil with at least one polyhydric alcohol in the presence of at least one alkaline catalyst and floridin.

12. Method of producing a drying oil from tall oil comprising the step of heating a mixture of said oil, at least one polyhydric alcohol, at least one alkaline catalyst and bentonite to a temperature between 180° and 350° C.

13. Method of producing a drying oil from tall oil comprising the steps of slowly heating a mixture of said oil, at least one polyhydric alcohol, at least one alkaline catalyst and at least one siliceous catalyst to a temperature of about 300° C, cooling the same thereafter to about 120° C, and filtering the same.

14. Method of producing a drying oil from tall oil comprising esterifying said oil with pentaerythritol in the presence of floridin.

15. Method of producing a drying oil from tall oil comprising esterifying said oil with pentaerythritol in the presence of bentonite.

16. Method of producing a drying oil from tall oil comprising esterifying said oil with pentaerythritol in the presence of at least one alkaline catalyst and floridin.

17. Method of producing a drying oil from tall oil comprising esterifying said oil with pentaerythritol in the presence of at least one alkaline catalyst and bentonite.

18. Method of producing a drying oil from tall oil comprising the step of heating a mixture of said oil, pentaerythritol and floridin to a temperature of between 180° and 350° C.

19. Method of producing a drying oil from tall oil comprising the step of heating a mixture of said oil, pentaerythritol and bentonite to a temperature of between 180° and 350° C.

20. Method of producing a drying oil from tall oil comprising the step of heating a mixture of said oil, pentaerythritol, at least one alkaline catalyst and floridin to a temperature of between 180° and 350° C.

21. Method of producing a drying oil from tall oil comprising the step of heating a mixture of said oil, pentaerythritol, at least one alkaline catalyst and bentonite to a temperature of between 180° and 350° C.

22. In the process of treating tall oil, the step of esterifying the same with at least one polyhydric alcohol in the presence of floridin.

23. In the process of treating tall oil, the step of esterifying the same with at least one polyhydric alcohol in the presence of bentonite.

FREDERICK CHARLES MARTIN.

REFERENCES CITED

The following references are of record in the file of this patent:

UNITED STATES PATENTS

| Number | Name | Date |
|---|---|---|
| 2,270,947 | Hough | Jan. 27, 1942 |
| 2,022,973 | Palmer et al. | Dec. 3, 1935 |

OTHER REFERENCES

Paint Manufacture, Jan. 1941, vol. XI, No. 1, page 4.